US008352459B2

(12) United States Patent
Pennell, Sr. et al.

(10) Patent No.: US 8,352,459 B2
(45) Date of Patent: Jan. 8, 2013

(54) SQL QUERIES FOR SIMPLE NETWORK MANAGEMENT PROTOCOL MANAGEMENT INFORMATION BASE TABLES

(75) Inventors: David Joel Pennell, Sr., Dripping Springs, TX (US); Alexander Pikovsky, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 12/508,062

(22) Filed: Jul. 23, 2009

(65) Prior Publication Data

US 2011/0022583 A1 Jan. 27, 2011

(51) Int. Cl.
*G06F 7/00* (2006.01)
*G06F 17/30* (2006.01)

(52) U.S. Cl. .......................... 707/713; 707/718; 709/224

(58) Field of Classification Search .......................... None
See application file for complete search history.

(56) References Cited

U.S. PATENT DOCUMENTS

| | | | |
|---|---|---|---|
| 6,076,107 A * | 6/2000 | Chen et al. ..................... | 709/224 |
| 6,341,281 B1 * | 1/2002 | MacNicol et al. ..................... | 1/1 |
| 6,363,391 B1 | 3/2002 | Rosensteel, Jr. | |
| 6,615,201 B1 * | 9/2003 | Seshadri et al. ..................... | 1/1 |
| 6,618,719 B1 | 9/2003 | Andrei | |
| 7,290,049 B2 | 10/2007 | Menzies et al. | |
| 2002/0147764 A1 | 10/2002 | Krupczak | |
| 2002/0188600 A1 * | 12/2002 | Lindsay et al. ..................... | 707/3 |
| 2004/0181541 A1 | 9/2004 | Groenendaal et al. | |
| 2006/0136368 A1 * | 6/2006 | Young-Lai et al. ............... | 707/2 |
| 2006/0167865 A1 * | 7/2006 | Andrei ............................. | 707/4 |
| 2007/0239667 A1 | 10/2007 | Di Giulio | |
| 2008/0033914 A1 * | 2/2008 | Cherniack et al. ................ | 707/3 |
| 2008/0154844 A1 * | 6/2008 | Gao et al. ......................... | 707/2 |

OTHER PUBLICATIONS

Oloveria et al., "Managing SNMP environment using Mobile SnmpSql", IEEE Corporate Communications, 1998, pp. 78-85.
Breitbart et al., "Relational Network Manager for IP Networks", Intn'l Conference on Internet Computing, Los Vegas, NV, 2004, pp. 1-7.

* cited by examiner

*Primary Examiner* — Loan T Nguyen
(74) *Attorney, Agent, or Firm* — Yee & Associates, P.C.; Jeffrey S. LaBaw

(57) ABSTRACT

A method and system for optimizing SQL queries for Simple Network Management Protocol (SNMP) Management Information Base (MIB) tables. An SNMP client receives a source query defined in structured query language to access data stored in one or more MIB tables. The SNMP client parses the source query into one or more queries and sub-queries and applies sets of optimization rules and heuristics to the source query to generate a query execution plan for each set of optimization rules and heuristics applied to the source query. The SNMP client selects an optimal query execution plan from the generated query execution plans and rewrites the source query as a SNMP-based query using the optimization rules and heuristics specified in the optimal query execution plan. The SNMP-based query may then be used to retrieve the data requested by the source query without performing a full query scan of the MIB tables.

9 Claims, 5 Drawing Sheets

TABLE: ipNetToMediaTable

| ipNetToMediaIfIndex | ipNetToMediaNetAddressIndex | ipNetToMediaPhysAddress | ipNetToMediaNetAddress |
|---|---|---|---|
| 1 | 1.2.3.4 | | |
| 2 | 4.25.35.17 | | |
| ... | | | |

↑ 402

TABLE: ifTable

| if.ifIndex | ifOperStatus | ifSpeed | ifInOctets |
|---|---|---|---|
| 1 | | | |
| 2 | | | |
| ... | | | |

SQL QUERIES FOR SIMPLE NETWORK MANAGEMENT PROTOCOL MANAGEMENT INFORMATION BASE TABLES

BACKGROUND

1. Field

The embodiments of the disclosure relate generally to an improved data processing system, and more specifically to a computer implemented method, data processing system, and computer program product for optimizing SQL queries for Simple Network Management Protocol (SNMP) Management Information Base (MIB) tables.

2. Description of the Related Art

In a data processing environment, data collection is the process of collecting values for computer system or network metrics using a data collection facility, such as SNMP. SNMP stands for "Simple Network Management Protocol," which is a protocol used by network hosts to exchange information used in the management of networks, such as Internet Protocol (IP) networks. SNMP network management is based on the client and server model. An SNMP client sends a request for SNMP data to an SNMP managed server or host. Each managed host runs a process called an agent, known as an SNMP Agent. The SNMP agent is a server process that maintains a management information base (MIB) database for the host. The SNMP managed host sends a response comprising the requested data that is stored in the management information base to the SNMP client.

Existing procedural approaches to SNMP data collection suffer from a number of drawbacks. Procedural solutions are typically developed and optimized for a certain data collection scenario (i.e., within a particular computer environment) and reflect a certain set of assumptions. As a result, an SNMP collection procedure may become sub-optimal or unsuitable when used in a different environment. For example, large Internet Service Providers (ISPs) and carriers have multiple families and generations of networking equipment with various SNMP-related idiosyncrasies and constraints. The same logical data (e.g., interface octet counter) can be collected in a number of alternative ways, some of which are better than the others. For instance, a straightforward SNMP data collection procedure may produce poor data collection results, while a sophisticated SNMP data collection procedure which offers better data collection results may be difficult to develop. In addition, although brute-force data collection methods may be used which systematically enumerate all possible data collection candidates for a procedural solution and check whether each data collection candidate satisfies the problem's statement, many brute-force data collection procedures scale poorly when management information base tables become very large. Thus, size and scale of the management information base tables in an SNMP environment may dictate using different procedures for collecting SNMP data. In addition, the complexity of a procedural solution increases very rapidly when a data collection scenario involves correlating data from a number of related management information base tables.

SUMMARY

The illustrative embodiments provide a computer implemented method, data processing system, and computer program product for optimizing SQL queries for Simple Network Management Protocol (SNMP) Management Information Base (MIB) tables. An SNMP client receives a source query defined in structured query language to access data stored in one or more Management Information Base tables. The SNMP client parses the source query into one or more queries and sub-queries and applies sets of optimization rules and heuristics to the source query to generate a query execution plan for each set of optimization rules and heuristics applied to the source query. The SNMP client selects an optimal query execution plan from the generated query execution plans and rewrites the source query as a SNMP-based query using the optimization rules and heuristics specified in the optimal query execution plan. The SNMP-based query may then be used to retrieve the data requested by the source query without performing a full query scan of the one or more Management Information Base tables.

BRIEF DESCRIPTION OF THE SEVERAL VIEWS OF THE DRAWINGS

FIG. 4 illustrates exemplary management information base tables from which the source query extracts network management information in accordance with the illustrative embodiments.

DETAILED DESCRIPTION

Figure 1:
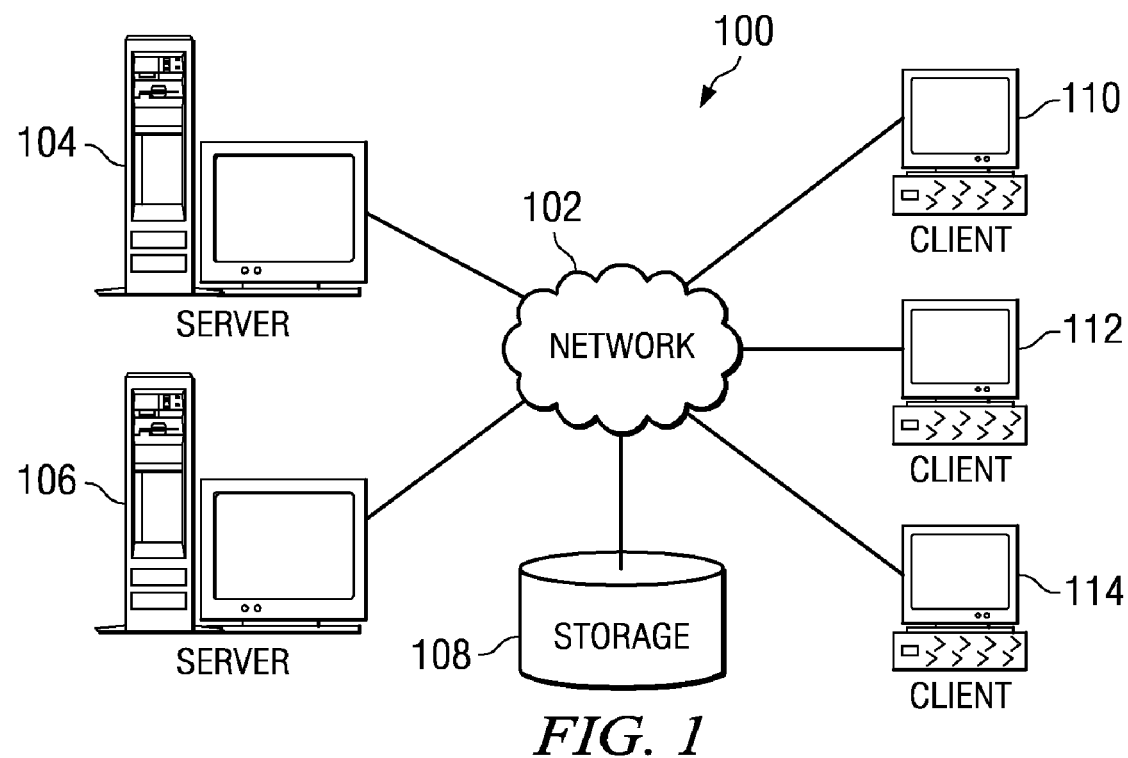
FIG. 1 depicts a pictorial representation of a network of data processing system in which illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or lock diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block; diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, of other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
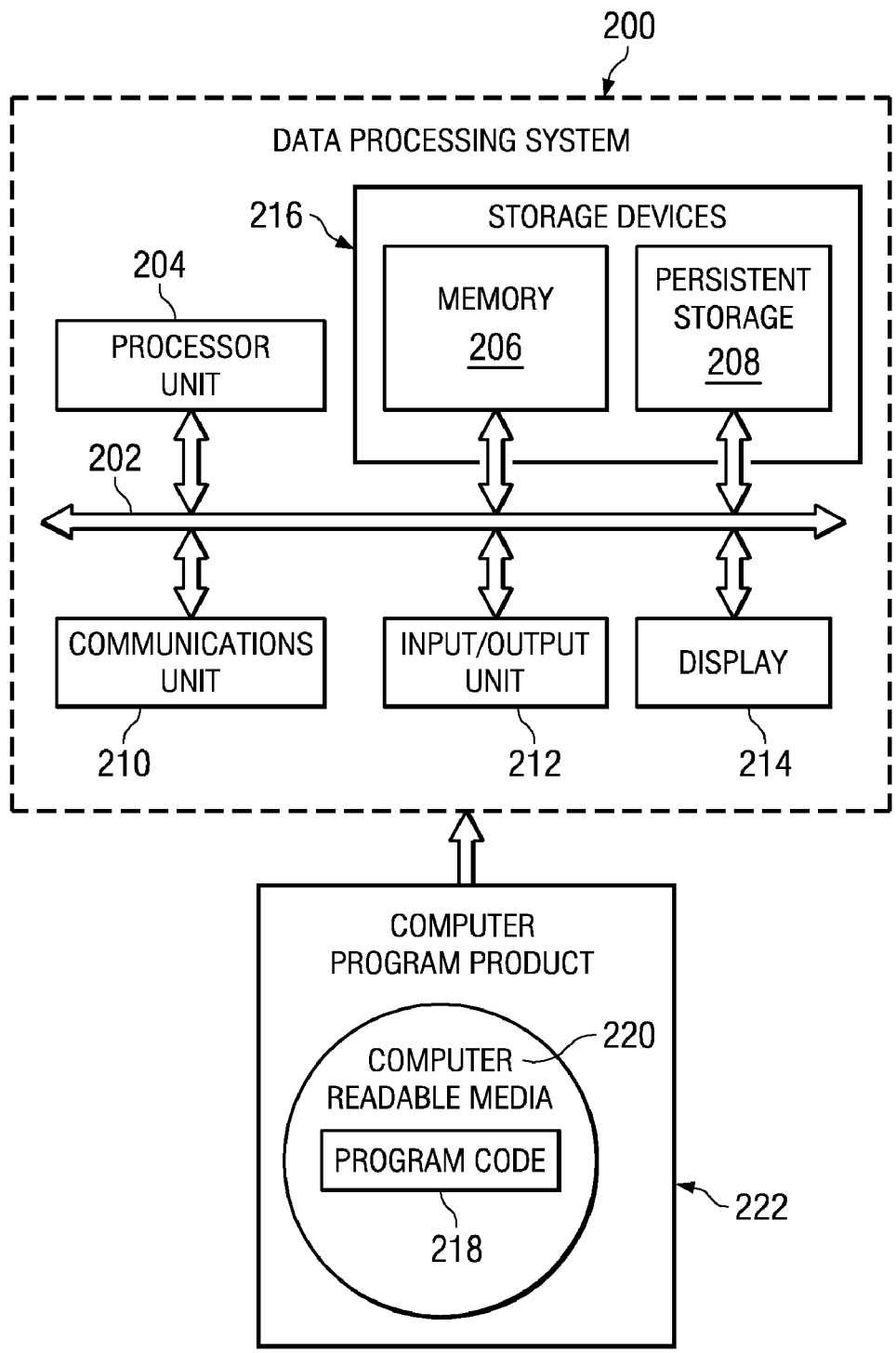
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer readable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending On the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Data is typically stored in a structured manner as to allow the data to be subject to query and analysis. Typically, this structure takes the form of one or more database tables having records that are arranged in a specific manner. These database tables may be queried and analyzed using database query and analysis commands such as are generally known in the art. For example, the Structured Query Language (SQL) is a declarative language used to interrogate and process data in a relational database. Originally developed by International Business Machines, Inc. (IBM) for its mainframes, all database systems designed for client/server environments support SQL. SQL commands can be used to interactively work with a database or can be embedded within a programming language to interface to a database.

The illustrative embodiments provide a computer implemented method, data processing system, and computer program product for using SQL queries for optimizing data collection in an SNMP environment. While SQL-based SNMP data collection methods are known in the art, these existing methods do not provide optimization techniques that enable scalability in large scale network management systems. An example of an existing SQL-based data collection method is SnmpSQL. SnmpSQL is a modified version of SQL that is used as a data manipulation language for managing SNMP environments. While existing SQL-based methods such as SnmpSQL manipulate SNMP data, these existing methods only deal with the efficient selection of SNMP agents, and they are also required to perform a full scan of the entire MIB table for each SNMP agent involved. Some of these MIB tables can be very large, and tables with hundreds of thousands rows are not uncommon. If a SQL query returns a single result row from an MIB table, the execution plan using a full scan of the table would be prohibitively expensive. Large scale network performance-management systems may run hundreds of thousands of these queries every minute. Consequently, existing SQL-based SNMP data collection methods have a limited practical use for large ISP deployments without employing the efficient query optimization techniques described in the illustrative embodiments.

The solution provided in the illustrative embodiments provides a SQL-based SNMP data collection mechanism with optimization strategies designed to produce efficient executable collection procedures to access and collect quality SNMP data, while enabling scalability among devices in the SNMP system. The illustrative embodiments extend existing query processing technology into the SNMP domain, thereby allowing users to write SNMP requests using a well-understood, declarative language such as SQL, rather than hand-crafting SNMP data collection procedures. The solution in the illustrative embodiments proposes a set of SNMP-specific rules that are applied to SQL queries. The SNMP-specific rules enable a SQL query optimizer to translate and rewrite the source declarative language into efficient SNMP queries and sub-queries for accessing and collecting quality SNMP data. By translating and rewriting the SQL query into an SNMP query, SNMP data may be collected from the management information base without performing a full scan of the management information base tables. Instead, for example, the SNMP query may only retrieve the data associated with the OID(s) in the query, thereby providing a more efficient data collection method. The SNMP-specific rules are applicable for a broad set of queries, from simple, single-table queries to complex queries with joins and nesting and hybrid queries that involve federating data from SNMP and traditional relational data sources. In addition, the SNMP-specific rules may be combined with some existing SQL query optimization rules and heuristics to facilitate optimization of complex queries, including multi-level joins. In some situations, the solution in the illustrative embodiments allows an entire SQL query to be optimized and rewritten as a single SNMP Get query. In other situations, the solution in the illustrative embodiments allows SQL joins to be optimized by first replacing nested loop joins with nested index loop joins, and then implementing the inner index lookup with an SNMP Get query. The solution is effective for both two-way and multi-way joins.

The declarative nature of the SQL query enables a query to be realized in a number of different ways, depending on the environment and the application needs. This ability to adapt a query to the specific user environment also opens a possibility for further deep runtime optimization that may take into account the nature of the tables, physical characteristics of the network, table size, and nature of data in management information base tables, etc. Queries may be written to dynamically join data from traditional relational database tables and management information base tables.

Figure 3:
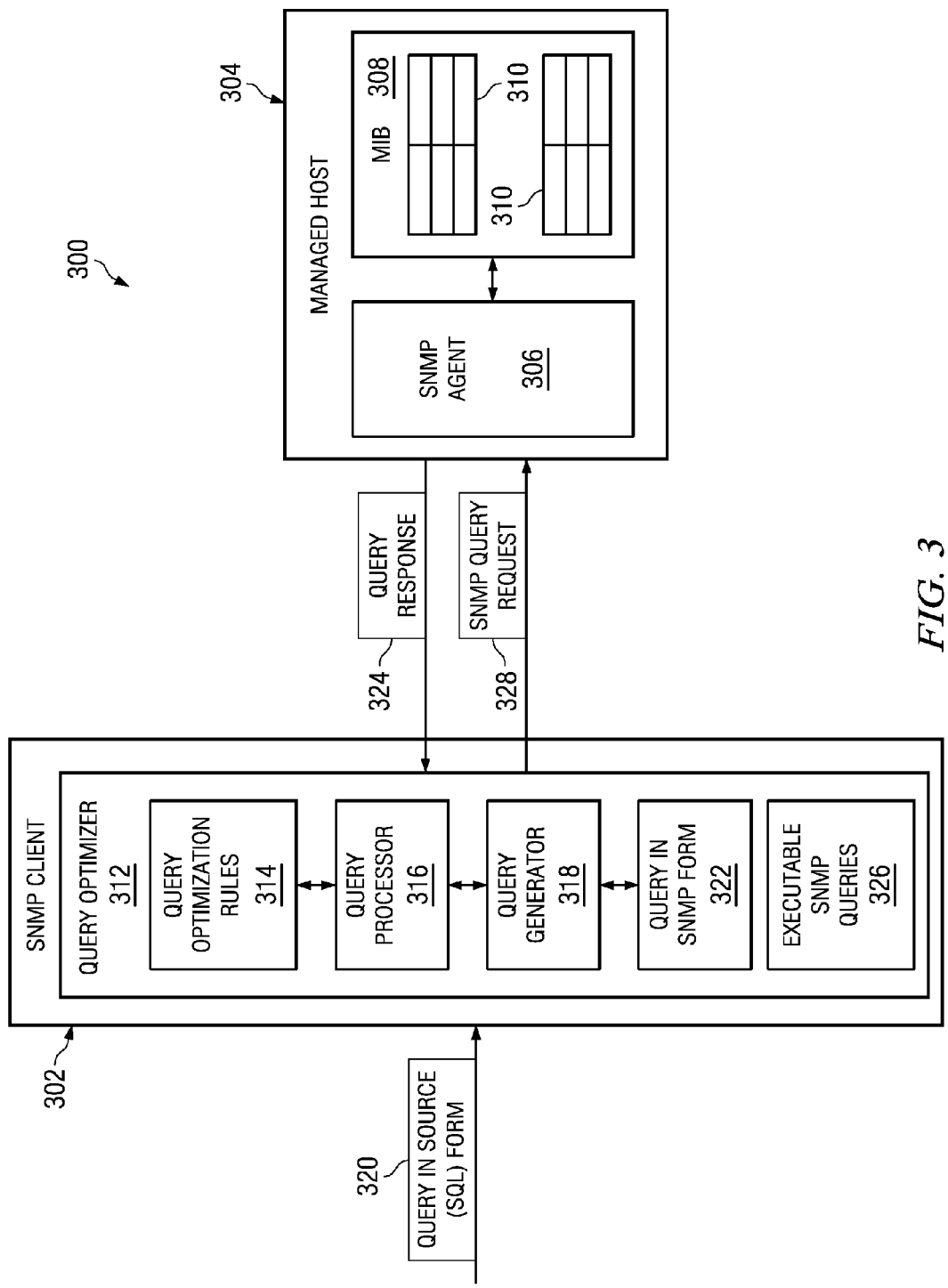
FIG. 3 is a block diagram of an exemplary SNMP architecture in which source query to executable plan processing may be implemented in accordance with the illustrative embodiments.

FIG. 3 is a block diagram of an exemplary SNMP architecture in which translating a source query to executable plan may be implemented in accordance with the illustrative embodiments. SNMP system 300 may be implemented in a network of data processing systems, such as network data processing system 100 in FIG. 1. SNMP system 300 utilizes SQL query language to access and collect quality SNMP data, as well as provides query optimization techniques to enable efficient data collection and device scaling. In this illustrative example, SNMP system 300 includes SNMP client 302 and SNMP managed host 304. However, it should be noted that SNMP system 300 is only meant as an example and not intended as a limitation on different illustrative embodiments. In other words, SNMP system 300 may include more or fewer components as necessary to accomplish processes of the different illustrative embodiments.

SNMP managed host 304 is an example of a server-side data processing system, such as server 104 and 106 in FIG. 1. SNMP managed host 304 is responsible for managing and storing SNMP data. SNMP managed host 304 comprises a server process, SNMP agent 306, which manages the management information base 308 for the managed host. SNMP agent 306 is coded in source code and uses a management information base text file describing an interface to the SNMP agent. When creating an SNMP agent, the developer is typically required to define the structure and types of the information supplied by the agent in a textual management information base file, and then implement the underlying agent source code in a programming language to populate the management information base. SNMP agent 306 collects and stores management information about devices in SNMP system 300 within management information base 308.

Management information base 308 comprises a collection of tables 310 in an actual or virtual database. Tables 310 comprise information used to manage network nodes or devices, such as, for example, but not limited to, routers, switches, hubs, and so forth, in an SNMP network. Tables 310 may be defined using Abstract Syntax Notation One (ASN.1). The software that performs the parsing is a management information base compiler. The database is hierarchical, or tree structured, in nature, and entries are addressed through object identifiers (OIDs). Each entry or row within a management information base table corresponds to a managed node or device in the SNMP system. Examples of management information base tables are illustrated in FIG. 4. FIG. 4 illustrates exemplary management information base tables from which the source query extracts network management information in accordance with the illustrative embodiments.

SNMP client 302 is an example of any type of computer device or peripheral, including personal computers such as clients 110, 112, and 114 in FIG. 1, other servers, workstations, mainframes, or other network devices. SNMP client 302 may query management information base 308 using a standard SNMP Get operation. An SNMP message comprising a SNMP Get operation may be used by SNMP client 302 to retrieve, from SNMP agent 306, data associated with a specified object identifier and stored in management information base 308 from the SNMP agent. The object identifier (OID) in the SNMP Get operation specifies the unique ID of a target managed object (i.e., a particular entry or a column in an indexed management information base table).

SNMP client 302 also comprises a query optimizer 312 that comprises various SNMP-specific optimizing rules and heuristics 314, query processor 316, and query generator 318. Query processor 316 parses SQL source query 320 into a simple SQL query (and sub-queries), and applies different sequences of rules and heuristics 314 to the parsed SQL source query (and sub-queries). The different series of optimizing rules and heuristics applied to the parsed source query may include known relational query optimization rules and heuristics to facilitate optimization of complex queries. The order in which the optimizing rules and heuristics are applied to the parsed source query may vary from rule set to rule set, and query processor 316 may modify the order based on the outcome of the previous optimizing rules and heuristics applied to the parsed source query. Thus, the query processor 316 may process the parsed source query in various optimization rules and heuristics combinations to generate execution query plans representing each set of optimization rules and heuristics applied. After query processor 316 has applied all of the optimization rules and heuristics and rule combinations to the parsed source query, the query processor selects the optimal execution query plan from all of the generated execution query plans. In one embodiment, selection of the optimal query plan may be based on the efficiency of the plans, such that the least computationally expensive plan is selected as the optimal plan.

Once the optimal execution query plan is determined, query processor 316 translates and rewrites the parsed source query and sub-queries into an SNMP query 322 for accessing and collecting SNMP data stored in management information base 308. As query processor 316 processes the parsed source query and sub-queries, query generator 318 generates SNMP query 322 for accessing and collecting SNMP data stored in management information base 308. SNMP client 302 executes query 322 by sending series of SNMP requests 328 (depending on what kind of SNMP query is generated, query 322 may be executed in one or more SNMP requests) to SNMP managed host 304 to access SNMP data stored in management information base 308. SNMP agent 306 sends responses 324 with the requested SNMP data to SNMP client 302.

When SNMP client 302 receives a SQL source query request (such as SQL source query 320) for a first time, the SQL source query may be parsed and processed by query processor 316 using optimizing rules and heuristics 314 in various ways to determine the optimal execution plan for the query, and SNMP query 322 is generated by query generator 318 to access the SNMP data in management information base 308. Each SNMP query generated by query optimizer 312 may be stored at SNMP client 302 for subsequent use by SNMP client 302. Thus, SNMP client 302 may refrain from having query processor 316 re-process/re-optimize the SQL source query and from having query generator 318 generate a corresponding SNMP query 322. Instead, SNMP client 302 may reuse SNMP queries stored in executable SNMP query 326, previously generated for the SQL source query, thereby reducing the expense of re-optimizing the same query. As a result, the same query (possibly with different parameters) is readily available and may be used immediately and repeatedly by applications that monitor and manage networks via SNMP. For example, SNMP client 302 may comprise a computer generated program which executes a previously generated SNMP query 326. Executing this pre-stored SNMP query sends request(s) 328 to managed host 304 and returns response(s) 324. Although the same SNMP query may be reused by SNMP client 302, it should be noted that the SNMP query request may comprise the same or different parameters than the previous request. The computer generated program may be used to send a single SNMP query request to the managed host, or the program may be used to send a series of query requests to the host. The program may also be used to send complex requests, such as a combination of SNMP messages, including requests that may combine the query response(s) 324 from the managed host in subsequent query requests sent to the host.

Query optimizer 312 may utilize known query processing technology to process queries based on SNMP-specific optimizing rules and heuristics 314. SNMP-specific optimizing rules and heuristics 314 comprise rules and heuristics that are used to translate and rewrite candidate SQL source queries into SNMP queries and determine the optimal query execution plan for the parsed source query. Query optimizer 312 may use knowledge of the management information base and SNMP-specific optimizing rules and heuristics 314 to make inferences on how to optimize the SQL source query. SNMP-specific optimizing rules and heuristics 314 include two novel rules for optimizing SQL queries to provide an efficient way to access data in an SNMP environment. One of these novel rules (Rule 1) in the series of optimizing rules and heuristics 314 comprises an SNMP direct index query optimization process. The SNMP direct-index query optimization proems allows ah entire SQL source query and/or sub-queries to be translated and rewritten as a single SNMP Get operation. By translating and rewriting the parsed source query into an SNMP Get query, the SNMP direct index query optimization process allows for retrieving SNMP data without performing a full query scan of the management information base tables. Instead, the SNMP Get query retrieves the target data in the management information base tables associated with the OID in the query, thereby providing a more efficient data collection method.

Consider the particular SQL source query example below:

```
SELECT ipNetToMediaPhysAddress, ipNetToMediaNetAddress
FROM MIB2.ipNetToMediaTable ip
WHERE ipNetToMediaIfIndex = 25 and
ipNetToMediaNetAddressIndex = '1.2.3.4'
```

In this example, ipNetToMediaTable in management information base 308 contains two index columns—ipNetToMediaIfIndex and ipNetToMediaNetAddressIndex. An example of ipNetToMediaTable is shown in FIG. 4. The values in the index columns are used as SNMP object identifiers. The SELECT clause in the SQL source query retrieves the data contained in the specified columns ipNetToMediaPhysAddress and ipNetToMediaNetAddress, and the FROM clause specifies the particular table, ipNetToMediaTable from which the data is to be retrieved. The WHERE clause specifies comparison predicates which restricts the number of rows returned by the query. In other words, the WHERE clause eliminates all rows from the result set where the comparison predicates ipNetToMediaIfIndex=25 and ipNetToMediaNetAddressIndex='1.2.3.4' do not evaluate to True.

In processing the parsed source query, query processor 316 examines the query to determine whether such a SQL source query will return a single row from a single table, such as table 402 shown in FIG. 4. If the SQL source query will return a single row from a single table, the SQL source query may be translated and rewritten into an SNMP Get operation by applying the SNMP direct index query optimization process in Rule 1 to the query. Query processor 316 determines that the SQL source query returns a single row from the table if the SQL source query meets the following conditions. First, the SQL source query obtains a description of a table within a management information base, such as management information base 308. Obtaining information about a table, such as knowledge of OIDs for specific columns and which columns, if any, comprise the index, does not require physical communication with SNMP agent 306, as table information is usually accessible since management information bases are published and generally available, so query processor 316 may pre-load this information before SQL source query 320 is processed. In this example, the query accesses a description of management information base table ipNetToMediaTable. Second, the comparison predicates of the SQL source query must comprise an equality condition against each column in the index of the table. In this example, the index columns in ipNetToMediaTable are ipNetToMediaIfIndex and ipNetToMediaNetAddressIndex, and both predicates specify an equality condition against the index columns. Third, the right side of each predicate in the SQL source query is a literal, or an exact search phrase. In this example, the literals in the predicates are number 25 for ipNetToMediaIfIndex and string '1.2.3.4' for ipNetToMediaNetAddressIndex. Thus, since table ipNetToMediaTable in management information base 308 has an index consisting of ipNetToMediaIfIndex and ipNetToMediaNetAddressIndex, the SQL source query above may be translated and rewritten into a single SNMP Get as follows:

SNMPGET(ipNetToMediaPhysAddress.25.1.2.3.4,ipNetToMediaNetAddress.25.1.2.3.4)

The row index in the ipNetToMediaTable that is used in the resulting SNMP Get operation is the concatenation of constants in the query predicate (e.g., 25 and 1.2.3.4) in the order of the index columns (ipNetToMediaIfIndex and ipNetToMediaNetAddressIndex) in the table ipNetToMediaTable.

Another example of a SQL source query is shown below:

```
SELECT ifOperStatus, ifSpeed, ifInOctets
FROM MIB2.ifTable if
WHERE if.ifIndex = 25
```

In this example, ifTable in management information base 308 contains one index column—if.ifIndex. This SQL source query retrieves the data contained in the specified columns: ifOperStatus, ifSpeed, and ifInOctets from the MIB2.ifTable where the index column if.ifIndex contains a value of 25. As table ifTable in management information base 308 has an index consisting of if.ifIndex, the SQL source query above may be translated and rewritten into a single SNMP Get as follows:

SNMPGET(ifOperStatus.25, ifSpeed.25, ifInOctets.25)

The second novel rule (Rule 2) in optimizing rules and heuristics 314 comprises an SNMP Get merge optimization process. The SNMP Get merge optimization process also allows an entire SQL query (and sub-queries) to be translated and rewritten as a single SNMP Get operation. The SNMP Get merge optimization process may be applied to SQL source queries that are Cartesian products. A Cartesian product is an output comprising rows from all of the tables listed in the query. A Cartesian product is generated from a cross-join in the SQL source query, where the join combines every row from one table in the query with every row in a second table in the query.

Consider a Cartesian Product of the two SQL source query examples above:

```
SELECT if.ifOperStatus, if.ifSpeed, ip.ipNetToMediaPhysAddress
FROM
    (SELECT * FROM MIB2.ipNetToMediaTable ip
    WHERE ipNetToMediaIfIndex = 25 and
    ipNetToMediaNetAddressIndex = '1.2.3.4'),
```

```
(SELECT * FROM MIB2.ifTable if
    WHERE ifIndex = 25)
```

In this example, the first SELECT clause in the SQL source query retrieves the data contained in the specified columns ifOpefStatus, ifSpeed, and ipNetToMediaPhysAddress and the FROM clause specifies sub-queries on tables (e.g., ipNetToMediaTable 402 and ifTable 404 in FIG. 4) from which the data is to be retrieved. The second SELECT clause—sub-query 1—specifies that all rows from ipNetToMediaTable are to be returned where the comparison predicates ipNetToMediaIfIndex=25 and ipNetToMediaNetAddressIndex= '1.2.3.4' evaluate to True, and the third SELECT clause—sub-query 2—specifies that all rows from ifTable are to be returned where the comparison predicates ifIndex=25 evaluates to True.

Upon receiving the SQL source query input above, query processor 316 parses and examines the query to determine whether each sub-query in such a Cartesian product returns a single row from the respective tables 402 and 404 in FIG. 4. For example, the Cartesian product for query Q is Q:Q1* . . . *Qn. If each element (Qi) in the SQL source query returns a single row from a table, the SQL source query may be translated and rewritten into a single SNMP Get operation by applying the SNMP Get merge optimization process in Rule 2 to the query. Like the conditions mentioned above for applying Rule 1 to a query, query processor 316 also determines that each element (Qi) in the query returns a single row from a table if the query requests access to a table within a management information base, the comparison predicates of the SQL source query comprise an equality condition against each index column in the tables, and the right side of each predicate in the SQL source query is a literal or an exact search phrase. If the SQL source query meets these conditions, query optimizer 312 may translate and rewrite the parsed source query into the single SNMP Get operation below:

SNMPGet(ifOperStatus.25, ifSpeed.25, ipNetToMediaPhysAddress.25.1.2.3.4)

The single SNMP Get operation comprises a union of all SNMP object identifiers in all Cartesian product elements (Qi).

Thus, query optimizer 312 determines if the optimizer can apply Rules 1 and 2 to the parsed source query. For example, if query optimizer 312 determines that the optimizer may apply Rule 1 to the source (sub)query, the optimizer knows that the source (sub)query returns a single row from the MIB tables. Since the optimizer knows that a single row is returned, the optimizer may implement that (sub)query using an SNMP Get command. Rule 1 allows query optimizer 312 to realize both that the (sub)query is going to return (at most) one row, as well as enables query optimizer 312 to construct OIDs for columns in that row, so the optimizer is able to rewrite that subquery into a single SNMP Get command. Unlike the other SNMP request commands, SNMP Get allows for obtaining data from an MIB table in a single request, rather than having to scan the whole table which is much more expensive. Thus, the SNMP Get generated using Rules 1 and 2 provides a large optimization advantage over existing SnmpSQL methods.

SNMP-based Rules 1 and 2 may be combined with well-known relational query optimization rules to optimize SQL queries for SNMP data sources. Some examples of relational query optimization rules include, but are not limited to, Constant Propagation and Pushing Predicate to Leaves. Constant Propagation substitutes a variable with a literal, if it can be inferred that the variable has an equal comparison with a literal in the same query predicate. For example, in the query below, the first comparison states that the query is only interested in rows where ipNetToMediaIfIndex from the table ipNetToMediaTable is equal to 2. Therefore, we can substitute all other uses of ipNetToMediaIfIndex in this query with 2. This translates the third comparison from

```
            if.ifIndex = ip.ipNetToMediaIfIndex
to
            if.ifIndex = 2.
```

Pushing Predicate to Leaves is a way to modify the original join query with predicate that has conditions on the tables used in the join such that parts of the predicate that only depend on one table are used in a sub-query against that table. In the query below, the comparisons

```
            ip.ipNetToMediaIfIndex = 2
            and ip.ipNetToMediaNetAddress = '1.2.3.4'
``` are against table ipNetToMediaTable, so the comparisons may be removed from the main query predicate and used in the sub-query

```
            (SELECT ipNetToMediaPhysAddress, ipNetToMediaNetAddress
            FROM SmeeMIB2.ipNetToMediaTable
            WHERE
                ipNetToMediaIfIndex = 2
                and ipNetToMediaNetAddress = '1.2.3.4')
```

Likewise, after constant substitution, the third comparison becomes
    if.ifIndex=2
so the comparison only depends on the table ifTable. The comparison may thus be removed from the main query predicate and used in a sub-query such as

```
            (SELECT ifOperStatus, ifSpeed
            FROM SmeeMIB2.ifTable
            WHERE ifIndex = 2).
```

These exemplary query optimization rules may be utilized to adjust the SQL source query in such as manner as to allow Rules 1 and 2 to be applied to the query. The following example illustrates how to optimize some common joins by combining the joins with commonly used relational query optimization rules. The following examples are used for illustration purposes only and are not meant to limit the scope of the illustrative embodiments to these particular relationship query optimization rules. Other relationship query optimization rules may be implemented within the illustrative embodiments without departing form the spirit and scope of the disclosure.

In the following SQL source query,

```
SELECT if.ifOperStatus, if.ifSpeed, ip.ipNetToMediaPhysAddress,
    ip.ipNetToMediaNetAddress
FROM MIB2.ifTable if, MIB2.ipNetToMediaTable ip
WHERE
    ip.ipNetToMediaIfIndex = 2
    and ip.ipNetToMediaNetAddress = '1.2.3.4'
    and if.ifIndex = ip.ipNetToMediaIfIndex
``` the constant is propagated from ipNetToMediaIfIndex to ifIndex, such that query processor 316 may replace the predicate if.ifIndex=ip.ipNetToMediaIfIndex with if ifIndex=2, as shown in the revised SQL source query:

```
SELECT if.ifOperStatus, if.ifSpeed, ip.ipNetToMediaPhysAddress,
    ip.ipNetToMediaNetAddress
FROM SmeeMIB2.ifTable if, SmeeMIB2.ipNetToMediaTable ip
WHERE
    ip.ipNetToMediaIfIndex = 2
    and ip.ipNetToMediaNetAddress = '1.2.3.4'
    and if.ifIndex = 2 /* Constant is propagated from
    ipNetToMediaIndex = 2 */
```

Query processor 316 may then push predicates that depend only on a single table to their leaves, thereby creating sub-queries in the source query. Consequently, the revised SQL source query now comprises the following:

```
SELECT if.ifOperStatus, if.ifSpeed, ip.ipNetToMediaPhysAddress,
    ip.ipNetToMediaNetAddress
FROM /* predicate for ifTable-only pushed here */
    (SELECT ifOperStatus, ifSpeed
    FROM SmeeMIB2.ifTable
    WHERE ifIndex = 2),
    /* predicate for ifNetToMediaTable-only pushed here */
    (SELECT ipNetToMediaPhysAddress, ipNetToMediaNetAddress
    FROM SmeeMIB2.ipNetToMediaTable
    WHERE
        ipNetToMediaIfIndex = 2
        and ipNetToMediaNetAddress = '1.2.3.4')
```

As this point, both sub-queries of the SQL source query meet the conditions for applying Rule 1 (SNMP direct index query rule). As a result, query optimizer 312 may replace both SQL sub-queries with SNMP Get operations as follows:

```
SELECT if.ifOperStatus, if.ifSpeed, ip.ipNetToMediaPhysAddress,
    ip.ipNetToMediaNetAddress
FROM
    SNMPGet(ifOperStatus.2, ifSpeed.2, ifInOctets.2),
    SNMPGet (ipNetToMediaPhysAddress.2.1.2.3.4,
    ipNetToMediaNetAddress.2.1.2.3.4)
```

The rewritten query now meets the conditions for applying Rule 2 (Cartesian product rewrite rule) to the sub-queries. As a result, query optimizer 312 may rewrite both SQL sub-queries with a single SNMP Get operation as follows:

```
SNMPGet (ifOperStatus.2, ifSpeed.2,
ipNetToMediaPhysAddress.2.1.2.3.4, ipNetToMediaNetAddress.2.1.2.3.4)
```

The examples described above contend with SQL queries that retrieve a single row of SNMP data. However, the optimization rules described herein may also be used to optimize joins where a full table scan is performed on the outer table. If the SQL query predicate allows query optimizer 312 to translate the query such that SNMP Get may be used for the inner table, a variation of the index nested loop join may be utilized, rather than the plain nested loop join, so that lookups oh the inner table are performed with an SNMP Get operation. For example, the following query

```
SELECT ifOperStatus, ifSpeed, ipNetToMediaPhysAddress,
   ipNetToMediaNetAddress
FROM SmeeMIB2.ifTable if, SmeeMIB2.ipNetToMediaTable ip
WHERE
     ipNetToMediaNetAddress = '1.2.3.4'
     and if.ifIndex = ip.ipNetToMediaIfIndex
``` may be rewritten as

```
Scan ipNetToMediaTable: GetBulk(ipNetToMediaPhysAddress,
   ipNetToMediaNetAddress)
     SNMPGet (ifOperStatus(ipNetToMediaIfIndex),
     ifSpeed(ipNetToMediaIfIndex)).
```

The resulting SNMP execution plan avoids the repetitive inner full table scan, performing an efficient SNMP Get operation instead. The technique described above may also be readily generalized to multi-way joins.

Figure 5:
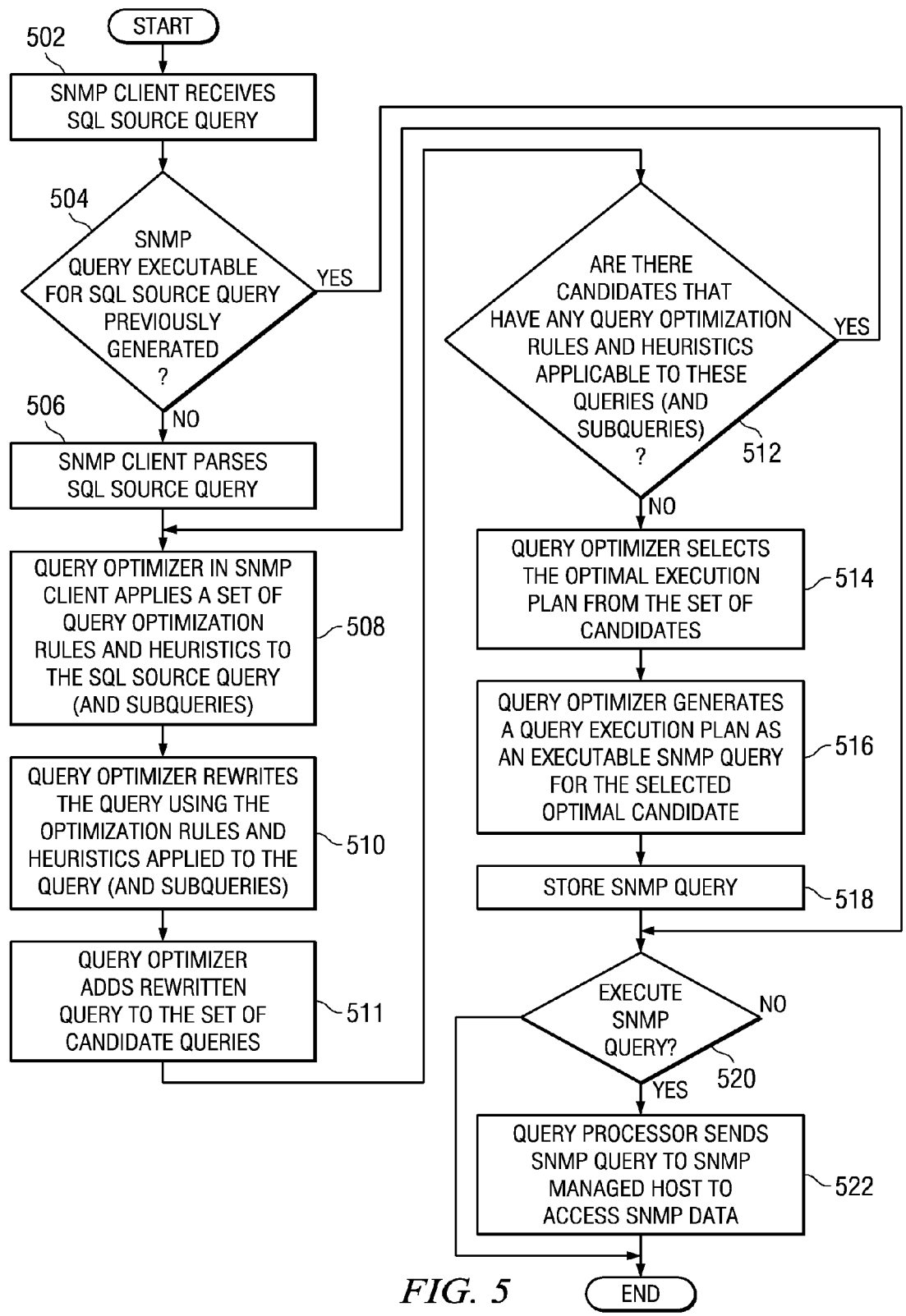
FIG. 5 is a block diagram of an exemplary source query to executable plan processing in accordance with the illustrative embodiments.

FIG. 5 is a block diagram of an exemplary source query to executable plan processing in accordance with the illustrative embodiments. The process described in FIG. 5 provides a SQL-based SNMP data collection mechanism that enables users to write SNMP requests using a declarative language such as SQL, rather than using hand-written SNMP data collection procedures. The process described in FIG. 5 may be implemented at an SNMP client device, such as SNMP client 302 in SNMP architecture 300 in FIG. 3.

The process begins when a source query in SQL query language is received at the SNMP client (step 502). The SNMP client examines the SQL source query and determines whether an SNMP-based query executable plan has previously been generated for the SQL source query (step 504). If an SNMP-based query executable plan has previously been generated for the SQL source query ('yes' output of step 504), the process continues to step 520 to determine whether to execute the previously generated and stored SNMP-based query executable plan.

However, if no SNMP-based query executable plan has previously been generated for the SQL source query (i.e., the SNMP client receives the SQL source query for the first time) ('no' output of step 504), the SNMP client parses the SQL source query into a relational graph of one or more simpler sub-queries (step 506). The query optimizer in the SNMP client then applies different series of optimization rules and heuristics to the parsed source query and sub-queries to translate the queries into candidate SNMP-based queries (step 508). In applying the optimization rules to the queries, the query optimizer may try different rules and combinations of rules to apply to the queries in various ways, and in particular, determine whether Rules 1 and 2 as proposed in the disclosure may be applied. The query optimizer may repeatedly try different equivalent representations of the same source (sub) query and applying a series of rules and costing techniques against the (sub)query to generate various candidates and eventually select the optimal query execution plan. Query execution plan is an executable, computer-generated program to execute the source query.

In the case of a simple source query, the query optimizer may apply Rule 1 to the query immediately. In the case of more complex source queries, the optimizer may apply different series of multiple rules to the queries. For example, Rule 1 may be applied individually to all or some of the sub-queries in the parsed source query, and Rule 2 may be applied to these sub-queries in order to merge the sub-queries into a single SNMP Get operation. In other situations, the query optimizer may apply other rules and heuristics in addition to Rule 1 and Rule 2 in various sequences to generate various query execution plans for complex source queries. For example, the constant propagation rule may be applied to replace a comparison in the main query with a constant, and the pushing predicates to leaves rule may then be applied to allow all comparisons in the sub-queries to depend on only one table. As the main query loses all comparisons, sub-queries become direct candidates for the application of Rule 1 and the main query becomes a Cartesian product. The sub-queries are replaced with SNMP Get commands, and the main query (a Cartesian product) is suitable for applying Rule 2. Consequently, the SNMP Gets from the sub-queries may be merged into a single SNMP Get command.

As the query optimizer applies a series of optimization rules to the source queries (and sub-queries), the query optimizer rewrites the query using the particular set of rules applied (step 510). The query optimizer then adds the rewritten query to the set of candidate queries (step 511). Applying optimization rules usually produces a number of intermediate queries. As other optimization rules are applied to the intermediate queries, additional intermediate queries are produced. All of the intermediate queries are candidates, and a best candidate may be selected as the optimal query.

A determination is made after each set of optimization rules is applied to determine if there are any other candidates which have any query optimization rules and heuristics applicable to these queries (and/or subqueries) (step 512). If there are more candidates ('yes' output of step 512), the process loops back to step 508 to allow the query optimizer to re-apply the set of optimization rules to the outputs of the previous step. However, if there are no more candidates ('no' output of step 512), the query optimizer then selects the optimal execution plan from the set of candidates (step 514). In one embodiment, selection of the optimal query plan may be based on the efficiency of the plans, such that the least computationally expensive plan is selected as the optimal plan. For instance, the example above in which the sequence of rules applied by the optimizer included applying the constant propagation rule and then applying the pushing predicates to leaves rules to the source query may be selected as an optimal execution plan over a plan that applies the pushing predicates to leaves rule prior to applying the constant propagation rule, since the latter plan produces a less efficient query. Thus, while the optimizer may apply various sequences of rules to the source query, the optimizer selects the plan that is most efficient to implement against the MIB tables.

Once the optimal query execution plan has been determined, the query optimizer generates a query execution plan as an executable SNMP query for the selected optimal candidate (step 516). This step compiles the executable SNMP query. The SNMP query comprises at least one SNMP request that retrieves information from tables in the management information base.

Once the query optimizer has generated the executable SNMP query, the SNMP client stores the executable SNMP query in memory for execution at a later time (step 518). The SNMP client then determines whether the SNMP query should be executed at this time (step 520). If the SNMP query should not be executed at this time ('no' output of step 520), the process terminates thereafter. However, if the SNMP query should be executed at this time ('yes' output of step 520), the SNMP client executes the SNMP query by sending a series of SNMP requests to an SNMP managed host to access SNMP data at the managed host (step 522), and the SNMP managed host may return the requested data in response message(s) to the SNMP client.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently; or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means of step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the embodiments of the disclosure in the forms disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The embodiments of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the embodiments of the disclosure can take the form of a computer program product accessible from a computer readable medium providing program code for use by or in connection with a computer or any instruction execution system. For the purposes of this description, a computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the embodiments of the disclosure in the forms disclosed. Many modifications and variations will be apparent to those of ordinary skill in the art. The embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method for optimizing queries for a Simple Network Management Protocol Management Information Base, the computer implemented method comprising:
a Simple Network Management Protocol client receiving a source query defined in structured query language to access data stored in one or more Management Information Base tables;
parsing the source query into one or more queries and sub-queries;
applying sets of optimization rules and heuristics to the parsed source query to generate a query execution plan for each set of optimization rules and heuristics applied to the parsed source query;
selecting an optimal query execution plan from the generated query execution plans;

rewriting the parsed source query into a Simple Network Management Protocol construct using the optimization rules and heuristics specified in the optimal query execution plan to form a Simple Network Management Protocol-based query; and the Simple Network Management Protocol client using the Simple Network Management Protocol-based query to retrieve the data requested by the source query without performing a full scan of the one or more Management Information Base tables to locate the data, wherein applying sets of optimization rules and heuristics to the source query further comprises:

determining whether the source query returns a single row from a Management Information Base table in the one or more Management Information Base tables; and responsive to a determination that the source query or subquery returns a single row from a Management Information Base table, applying a direct index query optimization rule to the source query, wherein the direct index query optimization rule is used to translate the source query into a single Simple Network Management Protocol Get operation that returns a single row from the Management Information Base table.

2. The computer implemented method of claim 1, further comprising:

responsive to a determination that the source query does not return a single row from a Management Information Base table, applying a Simple Network Management Protocol Get merge optimization rule to the source query, wherein the source query or subquery comprises a Cartesian product, and wherein the Simple Network Management Protocol Get merge optimization rule is used to translate the source query into a single Simple Network Management Protocol Get operation that returns a single row from the Management Information Base table.

3. The computer implemented method of claim 1, wherein the source query or subquery returns a single row from a Management Information Base table if comparison predicates in the source query or subquery comprise an equality condition against each index column of one management information base table and if each comparison predicate in the parsed source query or subquery is a constant value.

4. The computer implemented method of claim 1, wherein the Simple Network Management Protocol Get operation comprises a concatenation of comparison predicates constants of the source query or subquery in an order of index columns in the Management Information Base table.

5. A computer program product for optimizing queries for a Simple Network Management Protocol Management Information Base, the computer program product comprising:

a computer readable tangible storage device having computer readable program code stored therewith, the computer readable program code for execution by a computer, comprising:

computer readable program code for receiving a source query defined in structured query language to access data stored in one or more Management Information Base tables;

computer readable program code for parsing the source query into one or more queries and sub-queries;

computer readable program code for applying sets of optimization rules and heuristics to the parsed source query to generate a query execution plan for each set of optimization rules and heuristics applied to the parsed source query;

computer readable program code for selecting an optimal query execution plan from the generated query execution plans;

computer readable program code for rewriting the parsed source query into a Simple Network Management Protocol construct using the optimization rules and heuristics specified in the optimal query execution plan to form a Simple Network Management Protocol-based query; and computer readable program code for using the Simple Network Management Protocol-based query to retrieve the data requested by the source query without performing a full scan of the one or more Management Information Base tables to locate the data, wherein applying sets of optimization rules and heuristics to the source query further comprises:

determining whether the source query returns a single row from a Management Information Base table in the one or more Management Information Base tables; and responsive to a determination that the source query or subquery returns a single row from a Management Information Base table, applying a direct index query optimization rule to the source query, wherein the direct index query optimization rule is used to translate the source query into a single Simple Network Management Protocol Get operation that returns a single row from the Management Information Base table.

6. The computer program product of claim 5, further comprising:

responsive to a determination that the source query does not return a single row from a Management Information Base table, applying a Simple Network Management Protocol Get merge optimization rule to the source query, wherein the source query or subquery comprises a Cartesian product, and wherein the Simple Network Management Protocol Get merge optimization rule is used to translate the source query into a single Simple Network Management Protocol Get operation that returns a single row from the Management Information Base table.

7. The computer program product of claim 5, wherein the source query or subquery returns a single row from a Management Information Base table if comparison predicates in the source query or subquery comprise an equality condition against each index column of one management information base table and if each comparison predicate in the parsed source query or subquery is a constant value.

8. The computer program product of claim 5, wherein the computer readable program code is stored in a computer readable tangible storage device in a data processing system, and wherein the computer readable program code is downloaded over a network from a remote data processing system.

9. The computer program product of claim 5, wherein the computer readable program code is stored in a computer readable tangible storage device in a server data processing system, and wherein the computer readable program code is downloaded over a network from a remote data processing system for use in a computer readable tangible storage device with the remote system.

* * * * *